US012400574B2

(12) United States Patent
Li et al.

(10) Patent No.: US 12,400,574 B2
(45) Date of Patent: Aug. 26, 2025

(54) DISPLAY PANEL AND DISPLAY TERMINAL

(71) Applicant: Wuhan China Star Optoelectronics Semiconductor Display Technology Co., Ltd., Hubei (CN)

(72) Inventors: Xiaokang Li, Hubei (CN); Ruiting He, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/794,282

(22) PCT Filed: Jun. 27, 2022

(86) PCT No.: PCT/CN2022/101445
§ 371 (c)(1),
(2) Date: Jul. 21, 2022

(87) PCT Pub. No.: WO2023/231104
PCT Pub. Date: Dec. 7, 2023

(65) Prior Publication Data

US 2024/0185757 A1 Jun. 6, 2024

(30) Foreign Application Priority Data

May 30, 2022 (CN) ......................... 202210604054.3

(51) Int. Cl.
*G09G 3/20* (2006.01)

(52) U.S. Cl.
CPC ............ *G09G 3/2074* (2013.01); *G09G 3/20* (2013.01); *G09G 2300/0421* (2013.01); *G09G 2300/0426* (2013.01); *G09G 2300/043* (2013.01)

(58) Field of Classification Search
CPC ......... G09G 3/2074; G09G 2300/0421; G09G 2300/0426; G09G 2300/043
See application file for complete search history.

(56) References Cited

U.S. PATENT DOCUMENTS 9,508,751 B2 11/2016 Cai et al.
2007/0115244 A1 5/2007 Shin et al.
(Continued)

FOREIGN PATENT DOCUMENTS

CN 104218042 12/2014
CN 107340665 11/2017
(Continued)

OTHER PUBLICATIONS

International Search Report and the Written Opinion Dated Dec. 22, 2022 From the International Searching Authority Re. Application No. PCT/CN2022/101445 and Its Translation Into English. (18 Pages).
(Continued)

*Primary Examiner* — Adam R. Giesy

(57) ABSTRACT

The present application provides a display panel and a display terminal. The display panel includes a first metal layer and a second metal layer. The first metal layer includes data lines arranged in a display area and extending along a first direction. The second metal layer includes first transmission lines in the display area. Each of the first transmission lines is electrically connected to at least one data line. At least a portion of each of the first transmission lines extends along the first direction.

19 Claims, 10 Drawing Sheets

(56) References Cited

U.S. PATENT DOCUMENTS

| | | | | |
|---|---|---|---|---|
| 2021/0074731 | A1* | 3/2021 | Cheng | H01L 27/124 |
| 2023/0352391 | A1* | 11/2023 | Mi | H01L 23/49827 |

FOREIGN PATENT DOCUMENTS

| | | |
|---|---|---|
| CN | 109584776 | 4/2019 |
| CN | 1109351515 | 3/2020 |
| CN | 111668279 | 9/2020 |
| CN | 113539108 | 10/2021 |
| CN | 113964142 | 1/2022 |
| CN | 114171574 | 3/2022 |

OTHER PUBLICATIONS

Notification of Office Action and Search Report Dated Dec. 6, 2024 From The State Intellectual Property Office of the People's Republic of China Re. Application No. 202210604054.3 and Its Translation Into English. (15 Pages).

* cited by examiner

DISPLAY PANEL AND DISPLAY TERMINAL

RELATED APPLICATIONS

This application is a National Phase of PCT Patent Application No. PCT/CN2022/101445 having International filing date of Jun. 27, 2022, which claims the benefit of priority of Chinese Patent Application No. 202210604054.3 filed on May 30, 2022. The contents of the above applications are all incorporated by reference as if fully set forth herein in their entirety.

FIELD AND BACKGROUND OF THE DISCLOSURE

The present application relates to a field of display technology and in particular, to a display panel and a display terminal.

With the development of display panel technology, screen ratios have become an important criterion for product differentiation. In development of display panels today, there is an increasing trend towards a full screen. In the display panel design, narrowing a bezel width can greatly increase a screen ratio, so a narrow bezel design has attracted much attention. Traditional display panels generally have a first gate layer and a second gate layer in horizontal wiring to transmit gate driving signals, and have a first source-drain layer and a second source-drain layer in vertical wiring to transmit data signals and power signals. Furthermore, the traditional display panels have fan-out lines in left and right arc regions at a lower bezel of the display panel to connect data lines in a display area to a non-display area. The fan-out lines generally include the first gate layer and the second gate layer arranged alternately. The non-display area is a channel for all driving signal traces. A spacing of the data signal traces in the non-display area is much smaller than a spacing of the data lines in the display area, and there are other signal traces in the non-display area, so a layout design of the other signal traces and the data signal traces in the non-display area leads to a height of the fan-out traces, which occupies a large space at the lower bezel, resulting in a wider lower bezel.

In order to satisfy the need for narrower bezels, a space for wiring is getting smaller, and a spacing between lines is almost close to a smallest possible spacing in a production line. Even if the design is based on an extremely small spacing, requirements for narrow bezel requirements cannot be satisfied. Therefore, it is necessary to improve this defect.

SUMMARY OF THE INVENTION

The present application provides a display panel, which is used to solve a technical problem that lower bezels of conventional display panels are too wide and cannot meet design requirements for narrow bezels.

The present application provides a display panel. The display panel includes a display area and a non-display area arranged on at least one side of the display area, wherein the display panel includes a substrate, a first metal layer, and a second metal layer. The first metal layer is disposed on one side of the substrate, wherein the first metal layer includes a plurality of data lines disposed in the display area and extending along a first direction. The second metal layer is disposed on one side of the first metal layer away from the substrate, and the second metal layer includes a plurality of first transmission lines in the display area. Each of the first transmission lines is electrically connected to one of the data lines, and at least a portion of each of the first transmission lines extends along the first direction. A distance between each two adjacent first transmission lines extending along the first direction is smaller than a distance between each two adjacent data lines.

The present application further provides a display terminal. The display terminal includes a terminal body and a display panel. The terminal body and the display panel are combined into one, and the display panel includes a display area and a non-display area located on at least one side of the display area. The display panel includes: a substrate, a first metal layer, and a second metal layer. The first metal layer is disposed on one side of the substrate, wherein the first metal layer includes a plurality of data lines disposed in the display area and extending along a first direction. The second metal layer is disposed on one side of the first metal layer away from the substrate, wherein the second metal layer includes a plurality of first transmission lines in the display area, each of the first transmission lines is electrically connected to one of the data lines, and at least a portion of each of the first transmission lines extends along the first direction. A distance between each two adjacent first transmission lines extending along the first direction is smaller than a distance between each two adjacent data lines.

Advantages of the Present Application

A display panel of the present application includes a display area and a non-display area located on at least one side of the display area, the display panel includes a substrate, a first metal layer, and a second metal layer. The first metal layer is disposed on one side of the substrate. The first metal layer includes a plurality of data lines disposed in the display area and extending along a first direction. The second metal layer is disposed on one side of the first metal layer away from the substrate. The second metal layer includes a plurality of first transmission lines in the display area, and each of the first transmission lines is electrically connected to one of the data lines. At least a portion of each of the first transmission lines extends along the first direction. A distance between each two adjacent first transmission lines extending along the first direction is smaller than a distance between each two adjacent data lines. In the present application, by arranging the first transmission lines in the second metal layer and by transmitting data signals from the non-display area to the data line in the display area through the first transmission lines, fan-out lines can be arranged in the display area (Fan-out in AA). A distance between each two adjacent first transmission lines extending along the first direction is smaller than a distance between each two adjacent data lines, so that the first transmission lines can be arranged more densely, thus reducing an overall width occupied by the first transmission lines extending along the first direction, reducing and narrowing left and right arc regions at the lower bezel. That is to say, the present application can realize an extremely narrow frame design without adding extra processes or film layers.

DETAILED DESCRIPTION OF SPECIFIC EMBODIMENTS OF THE INVENTION

Figure 1:
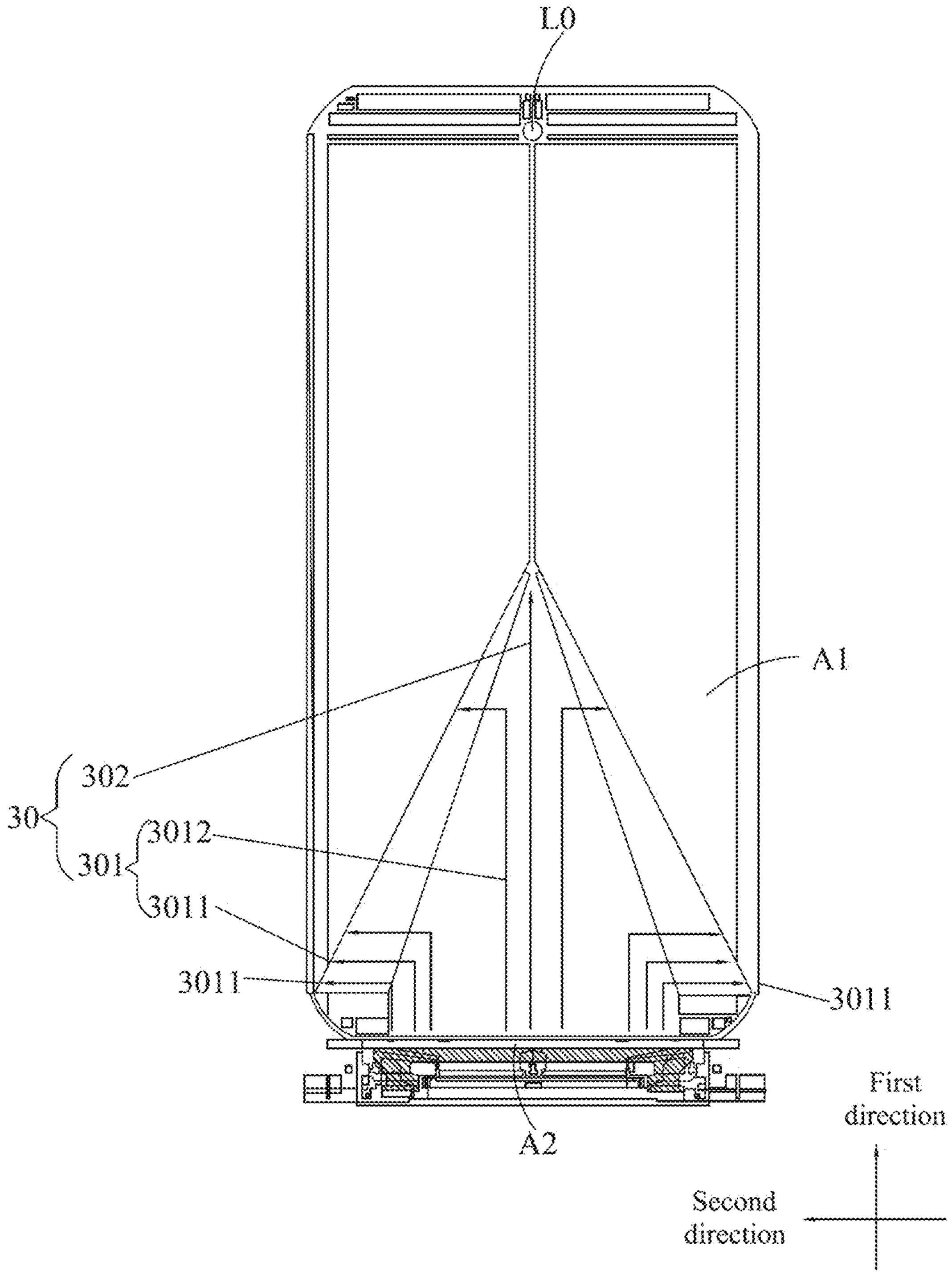
FIG. 1 is a schematic view of a basic structure of a display panel according to one embodiment of the present application.

Technical solutions of the present application will be clearly and completely described below with reference to the accompanying drawings and in conjunction with specific embodiments of the present application. In the drawings, for clarity and ease of understanding and description, dimensions and thicknesses of components depicted in the drawings are not to scale.

FIG. 1, FIG. 2, FIG. 3, and FIG. 4 are a schematic view of a basic structure of a display panel, a schematic view of a film layer structure of the display panel, a schematic view of a wiring arrangement of first transmission lines, and a schematic view of an electrical connection between a first transmission section and a data line according to one embodiment of the present application, respectively. The display panel includes a display area A1 and a non-display area A2 located on at least one side of the display area A1. The display panel includes a substrate 11, a first metal layer 20, and a second metal layer 30. The first metal layer 20 is disposed on one side of the substrate 11. The first metal layer 20 includes a plurality of data lines Data disposed in the display area A1 and the extending along the first direction. The second metal layer 30 is disposed on one side of the first metal layer 20 away from the substrate 11. The second metal layer 30 includes a plurality of first transmission lines 301 in the display area A1. Each of the first transmission lines 301 is electrically connected to at least one of the data lines Data, and at least a portion of each first transmission line 301 extends along a first direction. A distance between two adjacent first transmission lines 301 extending along the first direction is smaller than a distance between two adjacent data lines Data.

It can be understood that in conventional techniques, fan-out lines are usually arranged in the non-display area A2, so as to transmit data signals from the non-display area A2 to the data lines Data in the display area A1. However, a space occupied by the fan-out lines is relatively large, so that bezels of the display panel cannot be further reduced, and a design requirement for narrow bezels cannot be met. In the present application, the second metal layer 30 is used for a wiring arrangement of the first transmission lines 301. Through the first transmission lines 301, data signals are transmitted from the non-display area A2 to the data line Data in the display area A1, so as to realize a design in which the fan-out lines are placed in the display area A1. Moreover, the distance between two adjacent first transmission lines 301 extending along the first direction is smaller than the distance between two adjacent data lines Data. Consequently, the first transmission lines 301 can be arranged more densely, and the overall width occupied by all the first transmission lines 301 can be decreased. This further reduces and narrows left and right arc regions at the lower bezel of the display panel. That is to say, an extremely narrow bezel design can be realized without additional film layers and processes.

In one embodiment, in the display area A1, along a second direction, in the same unit distance, a number of the first transmission lines 301 is greater than a number of the data lines Data, and the second direction is perpendicular to the first direction.

It can be understood that, in the present embodiment, in the unit distance in the second direction, by making the number of the first transmission lines 301 greater than the number of the data lines Data, the first transmission lines 301 can be arranged more densely, and an overall width of the first transmission lines 301 can be reduced. Furthermore, the left and right arc regions in the bezel frame of the display panel can be reduced and narrowed. That is to say, an extremely narrow bezel design can be realized without additional film layers and processes.

It should be noted that the first metal layer 20 is a film layer for transmitting source and drain signals, and the second metal layer 30 is located between the first metal layer 20 and an anode layer (not illustrated). Driving electrical signals generated by thin film transistors (not illustrated) are transmitted from the first metal layer 20 to the second metal layer 30 and then to the anode layer.

It should be noted that conventional techniques use the first gate layer 60 or the second gate layer 70 for wiring of the fan-out lines. Instead, the present application uses the second metal layer 30 for wiring of the fan-out lines. Compared with the first gate layer 60 or the second gate layer 70, the second metal layer 30 has lower resistance, and has a low degree of signal attenuation. In the present application, the second metal layer 30 is effectively used to arrange the first transmission lines 301. Compared with conventional double-layer source-drain products, the present application does not need additional other film layers, nor does it need additional photomask processes. Thus, the present application prevents an increase in manufacturing costs, and a manufacturing process is simple, so that mass production can be realized.

It should be noted that only the second metal layer 30 is shown in FIG. 1. In one embodiment, the first transmission line 301 includes a first transmission section 3011 and a second transmission section 3012 in the display area A1, the second transmission section 3012 extends along the first direction, one end of the first transmission section 3011 is electrically connected to the data line Data, and the other end of the first transmission section 3011 is electrically connected to the second transmission section 3012.

Specifically, the first transmission line 301 is divided into a first transmission section 3011 and a second transmission section 3012. The second transmission section 3012 extends along the first direction (i.e., a vertical direction), and the first transmission section 3011 extends along the second direction (i.e., a horizontal direction). The second transmission section 3012 vertically transmits data signals upward from the non-display area A2. The first transmission section 3011 is connected to the second transmission section 3012, and the first transmission section 3011 transmits horizontally the vertically transmitted data signal. The data signal of each first transmission line 301 is correspondingly transmitted to at least one data line Data in the display area A1.

Figure 2:
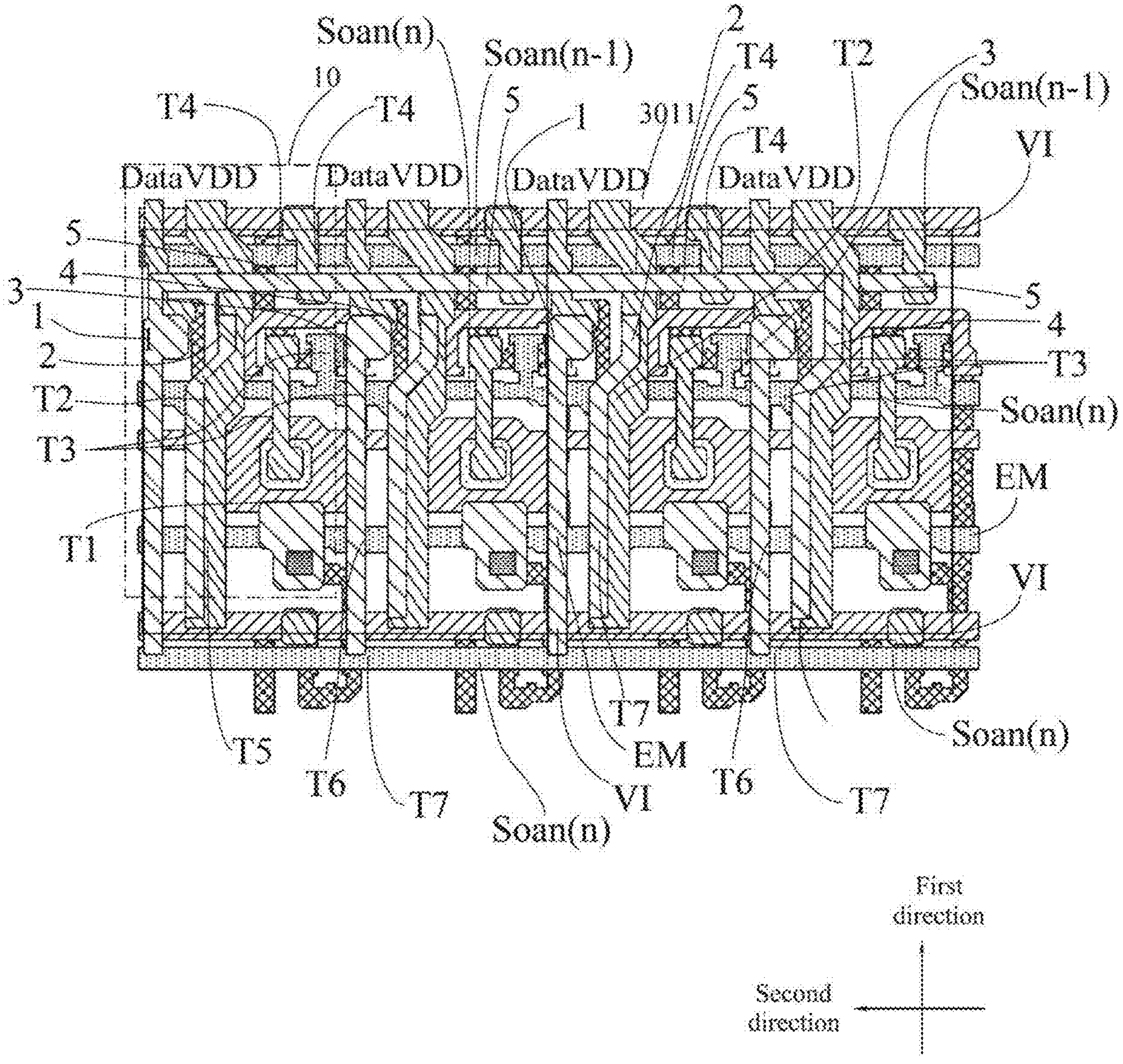
FIG. 2 is a schematic view of a film layer structure of the display panel according to one embodiment of the present application.

It should be noted that FIG. 2 only shows a wiring arrangement of one first transmission line 301. It can be seen from FIG. 2 that the second transmission section 3012 extends in the first direction and is connected to the first transmission section 3011. The first transmission section 3011 extends along the second direction and is electrically connected to the data line Data. That is to say, the data signal is transmitted through the second transmission section 3012 to the first transmission section 3011 (numeral reference 4→5), and is transmitted from the first transmission section 3011 to the data line Data. Then, the data signal can be transmitted through the data line Data to any sub-pixel 10 in an entire column. Accordingly, the present application realizes that the data signal is transmitted from the non-display area A2 to the display area A1.

Figure 3:
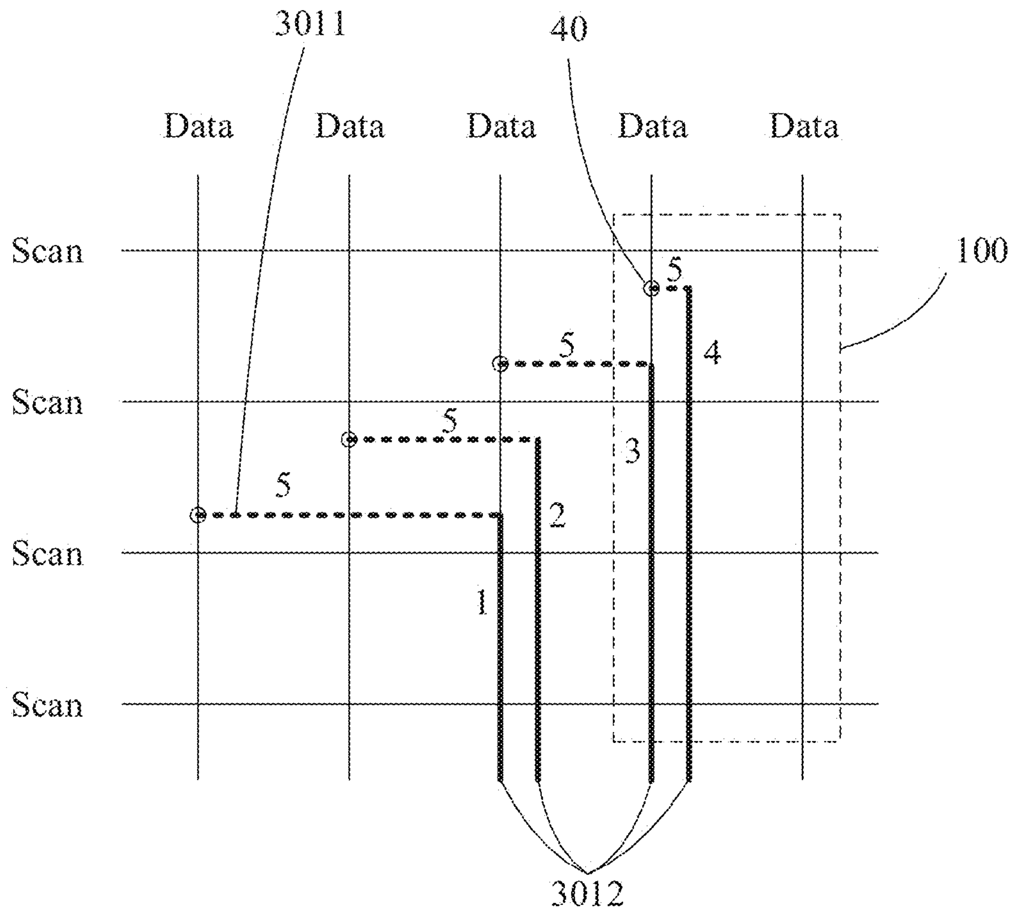
FIG. 3 is a schematic view of a wiring arrangement of first transmission lines according to one embodiment of the present application.
Figure 4:
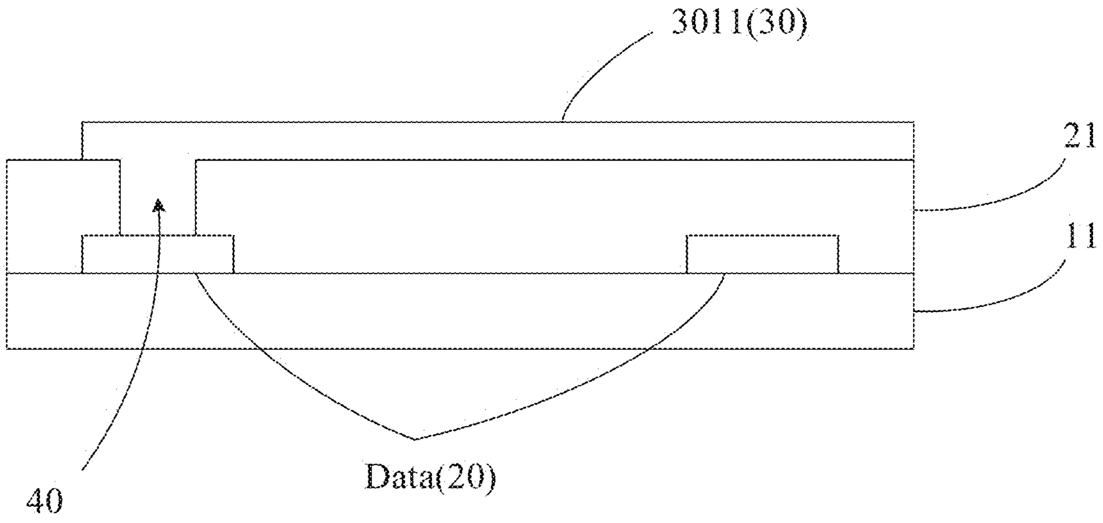
FIG. 4 is a schematic view of an electrical connection between a first transmission section and a data line according to one embodiment of the present application.
Figure 5:
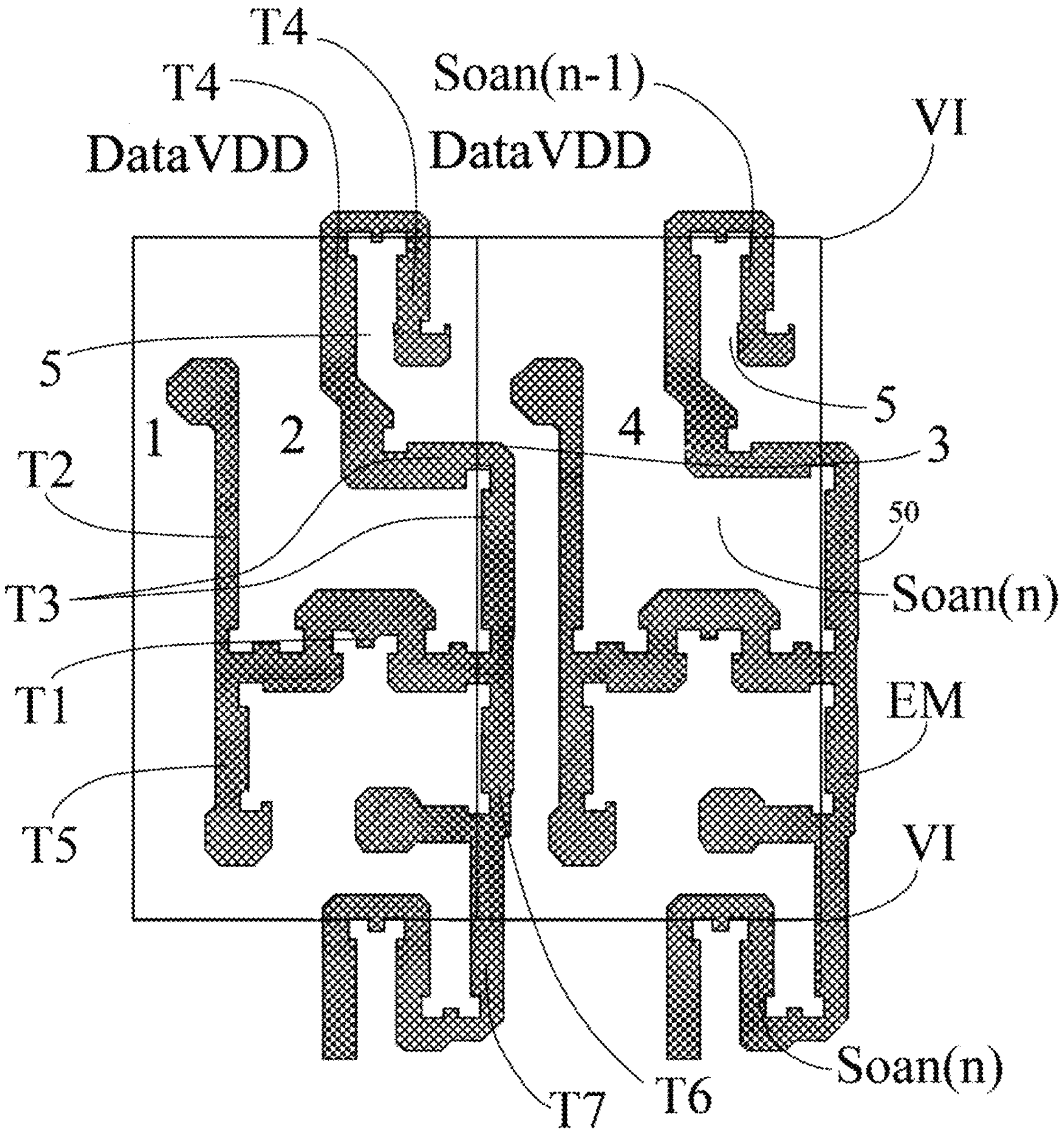
FIG. 5 is a schematic view of a film layer structure of an active layer according to one embodiment of the present application.
Figure 6:
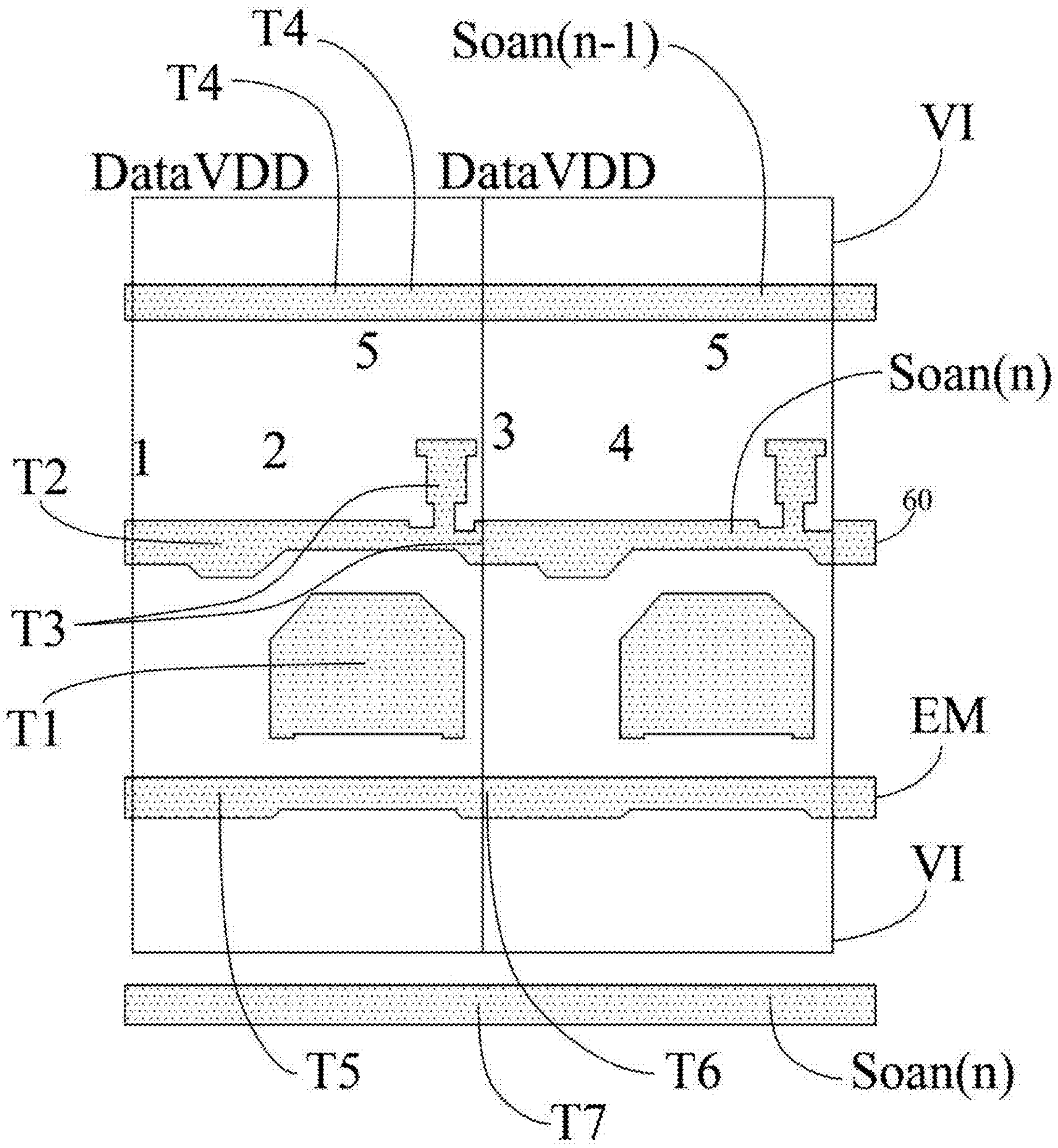
FIG. 6 is a schematic view of a film layer structure of a first gate layer according to one embodiment of the present application.
Figure 7:
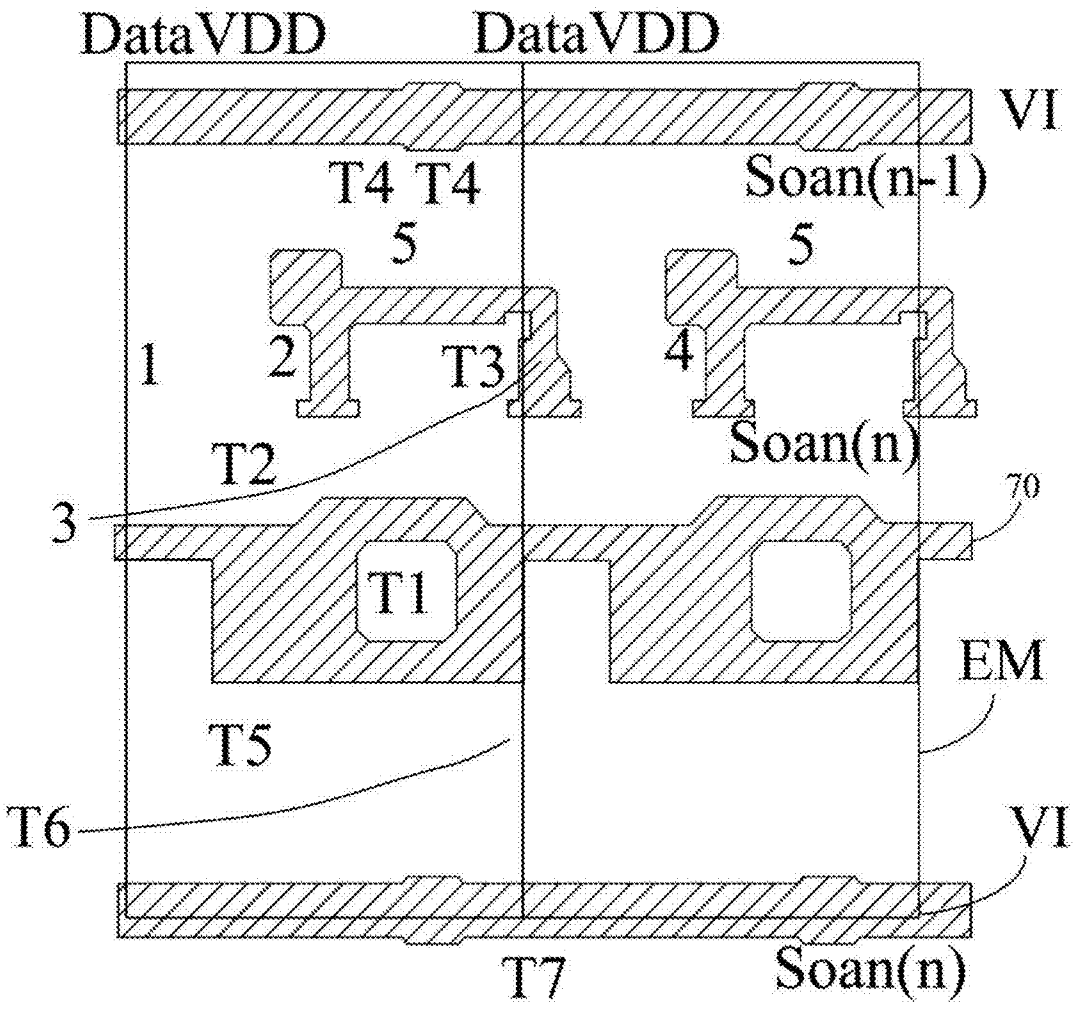
FIG. 7 is a schematic view of a film layer structure of a second gate layer according to one embodiment of the present application.
Figure 8:
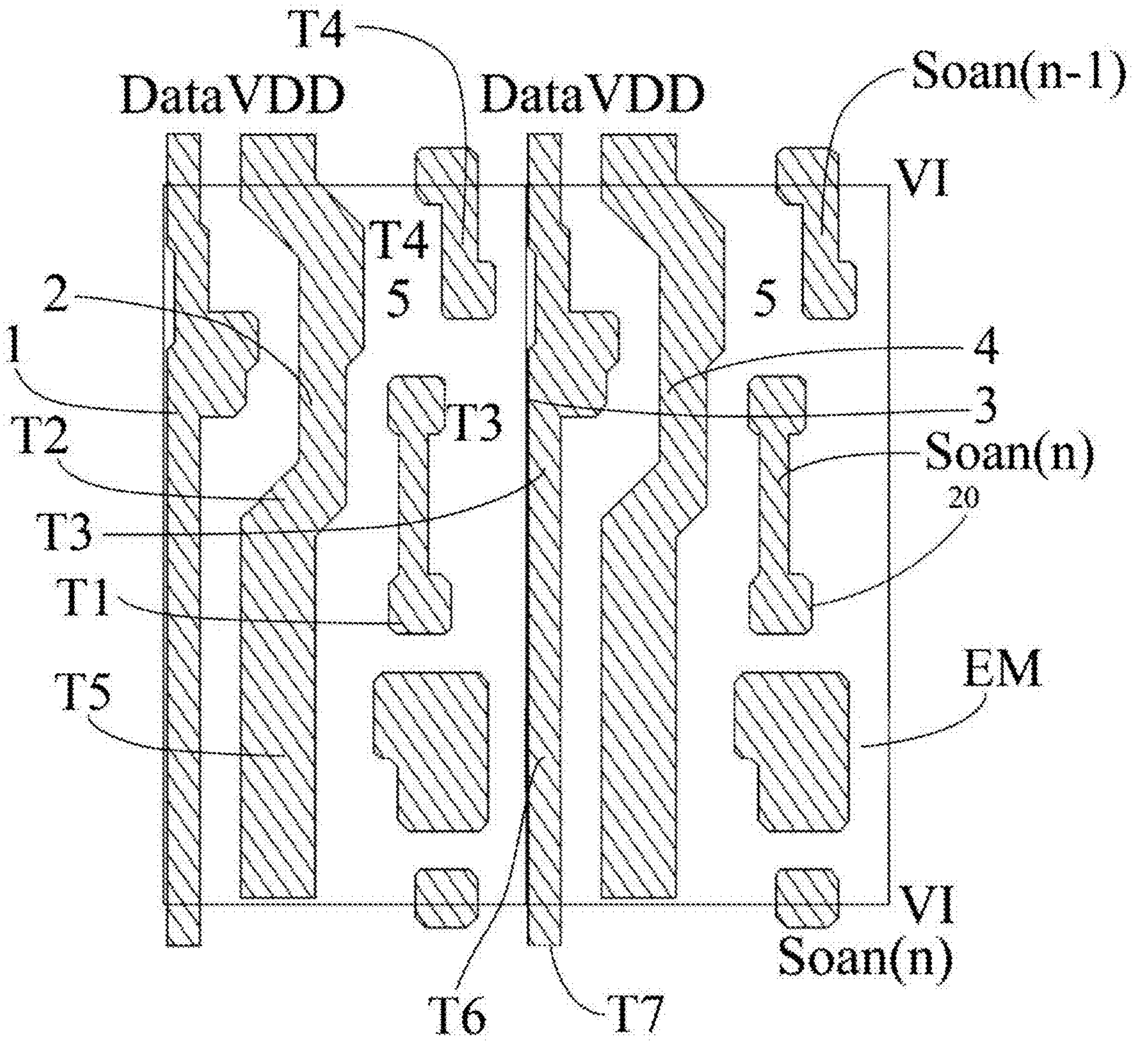
FIG. 8 is a schematic view of a film layer structure of a first metal layer according to one embodiment of the present application.
Figure 9:
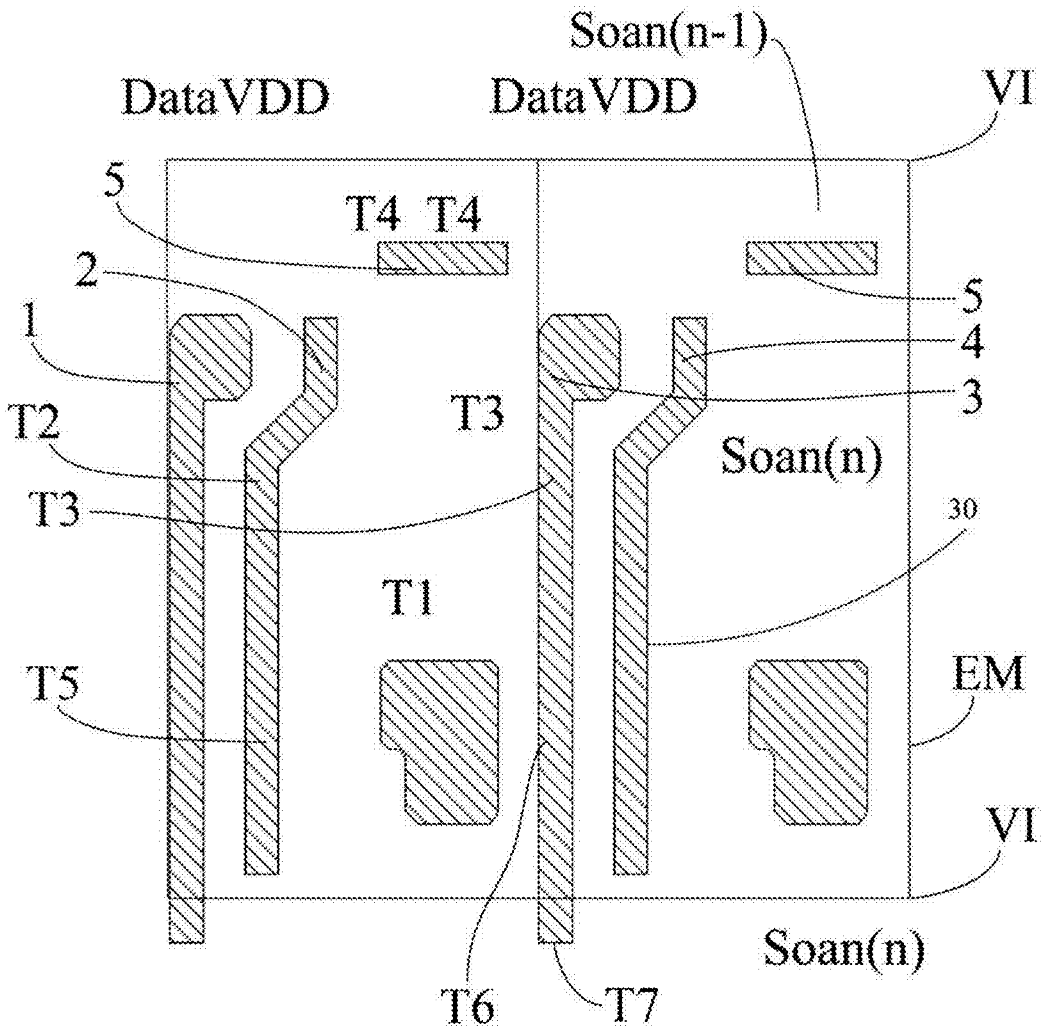
FIG. 9 is a schematic view of a film layer structure of a second metal layer according to one embodiment of the present application.
Figure 10:
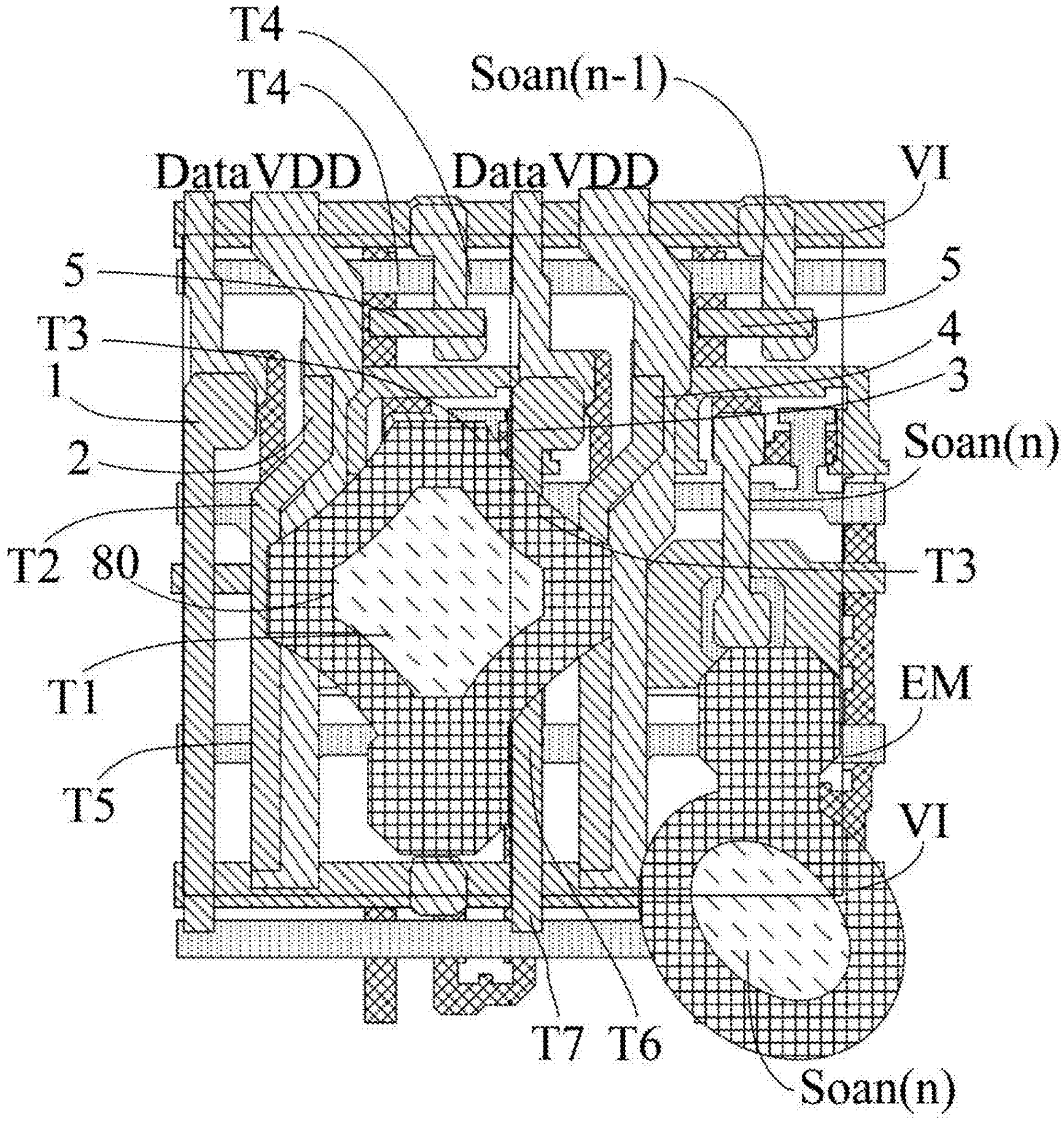
FIG. 10 is a schematic view of a film layer structure of a sub-pixel according to one embodiment of the present application.

It should be noted that reference numerals 1, 2, 3, and 4 in FIG. 2 indicate the second transmission sections 3012 which are used to transmit the data signal vertically upward from the non-display area A2. The reference numeral 5 indicates the first transmission section 3011 which horizontally transmits the data signal of the second transmission section 3012 to the data line Data. Specifically, as shown in FIG. 3, the lines marked 1, 2, 3, and 4 transmit data signals horizontally through the line marked 5. Then, the data signals are transmitted to the data line Data through a through hole 40, thereby realizing data signal transmission.

It should be noted that the display panel further includes scan lines Scan. The scan lines Scan are arranged horizontally and are used to transmit gate driving signals. The gate driving signals are supplied from a lateral bezel.

In one embodiment, a distance between two adjacent second transmission sections 3012 is smaller than the distance between two adjacent data lines Data. In this embodiment, it can be understood that, by making the distance between two adjacent second transmission sections 3012 smaller, the second transmission sections 3012 can be arranged more densely, and an overall width occupied by the second transmission sections 3012 can be decreased. Then, left and right arc regions at the lower bezel of the display panel can be narrowed and reduced. That is to say, an extremely narrow bezel design can be realized without additional processes and film layers.

In one embodiment, in the display area A1, along the second direction, in the same unit distance, a number of the second transmission sections 3012 is greater than the number of the data lines Data. The second direction is perpendicular to the first direction.

It can be understood that, in the present embodiment, by making the number of the second transmission sections 3012 per unit distance in the second direction greater than the number of the data lines Data, the second transmission sections 3012 can be arranged more densely, thus reducing the number of the second transmission sections 3012. Accordingly, the overall width occupied by the second transmission sections 3012 can further narrow the left and right arc regions at the lower bezel of the display panel. That is to say, an extremely narrow bezel design can be realized without additional processes or film layers.

In one embodiment, the display panel further includes a first insulating layer 21. The first insulating layer 21 is disposed between the first metal layer 20 and the second metal layer 30. The first insulating layer 21 includes a plurality of through holes 40. One end of the first transmission section 3011 is electrically connected to the data line Data through the through hole 40. That is to say, the data signal of the first transmission section 3011 is transmitted to the data line Data of the first metal layer 20 through the through hole 40 in the first insulating layer 21.

In one embodiment, the display area A1 is provided with multiple sub-pixels 10. The sub-pixels 10 include a plurality of sub-pixel columns 100 arranged at intervals along the second direction. At least one of the sub-pixel columns 100 overlaps with at least two of the second transmission sections 3012, and the second direction is perpendicular to the first direction.

Specifically, as can be seen from FIG. 3, one sub-pixel column 100 overlaps with two second transmission sections 3012. Therefore, the second transmission sections 3012 can be arranged more densely, thus reducing the overall width of the second transmission sections 3012. This reduces and narrows the arc region (i.e., a lower left corner area in FIG. 3) at the lower bezel of the display panel, thereby realizing an extremely narrow bezel design.

Continuing to refer to FIG. 1, in one embodiment, the second metal layer 30 includes at least one second transmission line 302 in the display area A1, the second transmission line 302 is electrically connected to the data line Data, and the second transmission line 302 extends along the first direction. The first transmission lines 301 are located at two sides of the second transmission line 302.

It can be understood that, in the present embodiment, the data signal can be transmitted to the data line Data through the first transmission line 301, and can also be transmitted to the data line Data through the second transmission line 302. The second transmission line 302 extends along the first direction. That is to say, the data signal is directly transmitted vertically to the through hole 40 through the second transmission line 302, and does need to be transmitted horizontally, which can reduce the difficulty in wiring and improve wiring flexibility.

In one embodiment, the end of the first transmission section 3011 electrically connected to the data line Data is at one side of the second transmission line 302 and away from the end of the first transmission section 3011 electrically connected to the second transmission section 3012. It can be understood that, by setting the first transmission section 3011 to transmit data signals in a direction away from the second transmission line 302, the present embodiment prevents a short circuit between the first transmission section 3011 and the second transmission line 302, which results in poor data signal transmission.

In one embodiment, the first transmission lines 301 are symmetrically arranged with respect to the second transmission line 302. It can be understood that, by arranging the first transmission lines 301 symmetrically with respect to the second transmission line 302 in this embodiment, the first transmission lines 301 on both sides of the second transmission line 302 can be evenly distributed, a length of the second transmission section 3012 in the first direction is reduced, and the impedance of the first transmission line 301 is reduced, thereby reducing the attenuation of the data signal.

In one embodiment, the display panel includes a virtual central axis L0 along the first direction, and the second transmission line 302 coincides with the virtual central axis L0. It can be understood that in the present embodiment, by arranging the second transmission line 302 at the position of the virtual central axis L0, the space on the left and right sides of the second transmission line 302 can be made equal. Accordingly, the present application can reserve the space close to the left and right bezels of the display panel, so as to narrow the space of the left and right arc regions at the lower bezel of the display panel, and meet the requirements for the narrow bezel design.

In one embodiment, in the first direction, a length of each of the second transmission sections 3012 gradually decreases along a direction away from the second transmission line 302. It should be noted that, in the first direction, the length of each of the second transmission sections 3012 gradually decreases along the direction away from the second transmission line 302, so the present application can avoid a short circuit between the first transmission lines 301. A length of each of the first transmission section 3011 gradually increases along the direction away from the second transmission line 302 to balance a difference resulting from the gradually shorter second transmission sections 3012, so that impedances of the first transmission lines 301 are uniformly distributed, and a better transmission effect is achieved.

In one embodiment, an orthographic projection of each of at least one of the second transmission sections 3012 projected on the first metal layer 20 coincides with one of the data lines Data. It can be understood that, by arranging the second transmission section 3012 above the data line Data, the present embodiment can shield an influence of jumping changes of the data signal on a gate (i.e., a Q point) of a driving transistor in a pixel circuit of the sub-pixel 10, and can realize a wiring arrangement in which the second transmission line 302 is directly electrically connected to the data line Data through the through hole 40.

In one embodiment, the first metal layer 20 further includes a plurality of power supply lines VDD, the power supply lines VDD extend along the first direction. An orthographic projection of each of at least one of the second transmission sections 3012 projected on the first metal layer 20 coincides with one of the power supply lines VDD.

It should be noted that the power supply lines VDD in conventional techniques are arranged in the second metal layer 30. In the present embodiment, the power supply lines VDD and the data lines Data are arranged in the same layer to free up the second metal layer 30 and facilitate the wiring arrangement of the first transmission lines 301 and/or the second transmission line 302. In addition, the power supply lines VDD are located inside the data lines Data. Therefore, by arranging the second transmission section 3012 above the power supply line VDD, the present application can also shield the influence of the jumping changes of the data signal on the gate (i.e. the Q point) of the driving transistor in the pixel circuit of the sub-pixel 10.

Continuing to refer to FIG. 2, it should be noted that the sub-pixels 10 provided in the present application have a 7T1C pixel structure. A 7T1C pixel circuit connection configuration is not the main point of the present application, and therefore a detailed description of the 7T1C pixel circuit connection configuration is omitted. Specifically, the display panel further includes an active layer 50, a first gate layer 60, and a second gate layer 70. Please refer to FIG. 5 to FIG. 10, which are schematic film layer structure views showing the active layer, the first gate layer, the second gate layer, the first metal layer, the second metal layer, and the sub-pixel. The display panel further includes a light-emitting unit 80.

In one embodiment, the display panel includes the first gate layer 60 and the second gate layer 70. The first gate layer 60 is located at one side of the first metal layer 20 and away from the second metal layer 30. The second gate layer 70 is located between the first gate layer 60 and the first metal layer 20. One end of the first transmission line 301 close to the non-display area A2 is electrically connected to the first gate layer 60 or the second gate layer 70.

Figure 11:
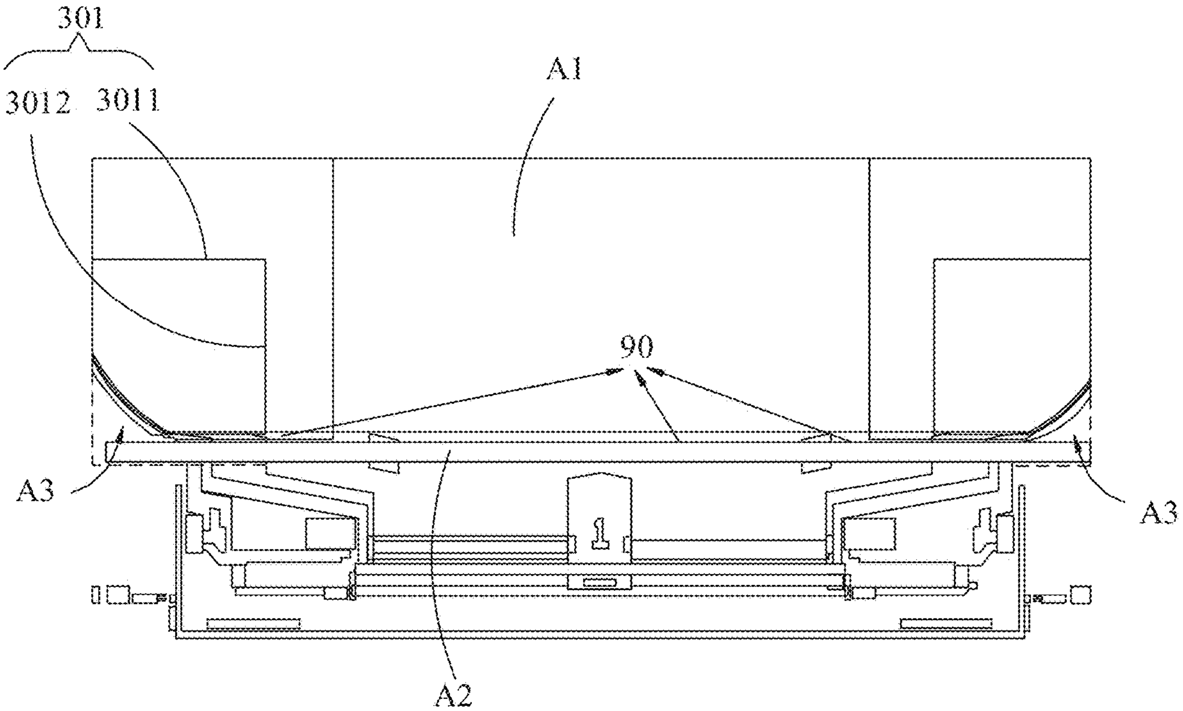
FIG. 11 is a schematic view illustrating a basic structure of the display panel according to another embodiment of the present application.

Specifically, please refer to FIG. 11, which is a schematic view illustrating a basic structure of the display panel according to another embodiment of the application. It should be noted that, in this embodiment, the second transmission section 3012 of the first transmission line 301 only transmits data signals vertically upward from a bottom of the display area A1, and the data signals are transmitted from the non-display area A2 to the bottom of the display area A1 through fan-out lines 90. The fan-out lines 90 are alternately arranged through the first gate layer 60 and the second gate layer 70. As can be seen from FIG. 11, by using the wiring arrangement of this embodiment, the space of left and right arc regions A3 at the lower bezel of the display panel can be reduced and narrowed, thereby realizing the extremely narrow bezel design.

The present application further provides a display terminal, including a terminal body and the above-mentioned display panel. The terminal body and the display panel are combined into one. Please refer to FIG. 1 to FIG. 11 and related descriptions for the structure of the display panel, and a detailed description thereof is not repeated here. The display terminal of the present application can be a product or component with a display function, such as a mobile phone, a tablet computer, a notebook computer, a television, a digital camera, and a navigator.

The display panel and the display terminal of the present application are described in detail above. It should be understood that the exemplary embodiments described herein are illustrative only, and are used for ease of understanding the method and the main ideas of the present application, but not to limit the present application.

What is claimed is:

1. A display panel comprising a display area and a non-display area arranged on at least one side of the display area, wherein the display panel comprises: a substrate; a first metal layer disposed on one side of the substrate, wherein the first metal layer comprises a plurality of data lines disposed in the display area and extending along a first direction; a second metal layer disposed on one side of the first metal layer away from the substrate, wherein the second metal layer comprises a plurality of first transmission lines in the display area, each of the first transmission lines is electrically connected to one of the data lines, and at least a portion of each of the first transmission lines extends along the first direction a first gate layer disposed on one side of the first metal layer away from the second metal layer; and a second gate layer disposed between the first gate layer and the first metal layer; wherein a distance between each two adjacent first transmission lines extending along the first direction is smaller than a distance between each two adjacent data lines, wherein one end of each of the first transmission lines close to the non-display area is electrically connected to the first gate layer or the second gate layer.

2. The display panel according to claim 1, wherein each of the first transmission lines comprises a first transmission section and a second transmission section in the display area, each of the second transmission sections extends along the first direction, one end of each of the first transmission sections is electrically connected to one of the data lines, and another end of each of the first transmission sections is electrically connected to one of the second transmission sections.

3. The display panel according to claim 2, wherein the second metal layer comprises at least one second transmission line disposed in the display area, the at least one second transmission line is electrically connected to at least one of the data lines, and the at least one second transmission line extends along the first direction;

wherein the first transmission lines are disposed at two sides of the at least one second transmission line.

4. The display panel according to claim 3, wherein in each first transmission section, the end of the first transmission section electrically connected to one of the data lines is at one side of the at least one second transmission line and away from the end of the first transmission section electrically connected to one of the second transmission sections.

5. The display panel according to claim 4, wherein the first transmission lines are symmetrically arranged with respect to the at least one second transmission line.

6. The display panel according to claim 3, wherein the display panel comprises a virtual central axis along the first direction, and one of the at least one second transmission line coincides with the virtual central axis.

7. The display panel according to claim 3, wherein in the first direction, a length of each of the second transmission sections gradually decreases in a direction away from the at least one second transmission line.

8. The display panel according to claim 2, wherein a distance between each two adjacent second transmission sections is smaller than a distance between each two adjacent data lines.

9. The display panel according to claim 2, wherein in the display area, along a second direction, per same unit distance, a number of the second transmission sections is greater than a number of the data lines, and the second direction is perpendicular to the first direction.

10. The display panel according to claim 2, wherein the display panel further comprises:

a first insulating layer arranged between the first metal layer and the second metal layer, wherein the first insulating layer comprises a plurality of through holes, and one end of each of the first transmissions is electrically connected to one of the data lines through one of the through holes.

11. The display panel according to claim 2, wherein a plurality of sub-pixels are disposed in the display area, the sub-pixels comprise a plurality of sub-pixel columns spaced along the second direction, at least one of the sub-pixel columns overlaps at least two of the second transmission sections, and the second direction is perpendicular to the first direction.

12. The display panel according to claim 2, wherein an orthographic projection of each of at least one of the second transmission sections projected on the first metal layer coincides with one of the data lines.

13. The display panel according to claim 2, wherein the first metal layer further includes a plurality of power supply lines, the power supply lines extend along the first direction, and an orthographic projection of each of at least one of the second transmission sections projected on the first metal layer coincides with one of the power supply lines.

14. The display panel according to claim 1, wherein in the display area, along a second direction, per same unit distance, a number of the first transmission lines is greater than a number of the data lines, and the second direction is perpendicular to the first direction.

15. A display terminal, comprising a terminal body and a display panel, wherein the terminal body and the display panel are combined into one, and the display panel comprises a display area and a non-display area located on at least one side of the display area; wherein the display panel comprises: a substrate; a first metal layer disposed on one side of the substrate, wherein the first metal layer comprises a plurality of data lines disposed in the display area and extending along a first direction; a second metal layer disposed on one side of the first metal layer away from the substrate, wherein the second metal layer comprises a plurality of first transmission lines in the display area, each of the first transmission lines is electrically connected to one of the data lines, and at least a portion of each of the first transmission lines extends along the first direction; a first gate layer disposed on one side of the first metal layer away from the second metal layer; and a second gate layer disposed between the first gate layer and the first metal layer; wherein a distance between each two adjacent first transmission lines extending along the first direction is smaller than a distance between each two adjacent data lines, wherein one end of each of the first transmission lines close to the non-display area is electrically connected to the first gate layer or the second gate layer.

16. The display terminal according to claim 15, wherein each of the first transmission lines comprises a first transmission section and a second transmission section in the display area, each of the second transmission sections extends along the first direction, one end of each of the first transmission sections is electrically connected to one of the data lines, and another end of each of the first transmission sections is electrically connected to one of the second transmission sections.

17. The display terminal according to claim 16, wherein the second metal layer comprises at least one second transmission line disposed in the display area, the at least one second transmission line is electrically connected to the data lines, and the at least one second transmission line extends along the first direction;

wherein the first transmission lines are disposed at two sides of the at least one second transmission line.

18. The display terminal according to claim 17, wherein the display panel comprises a virtual central axis along the first direction, and one of the at least one second transmission line coincides with the virtual central axis.

19. The display panel according to claim 17, wherein in the first direction, a length of each of the second transmission sections gradually decreases in a direction away from the at least one second transmission line.

* * * * *